(12) United States Patent
Singh et al.

(10) Patent No.: US 6,248,842 B1
(45) Date of Patent: Jun. 19, 2001

(54) SYNTHETIC POLYMER MATRICES INCLUDING PRE-ORGANIZED CHELATION SITES FOR THE SELECTIVE AND REVERSIBLE BINDING OF METALS

(75) Inventors: Alok Singh, Springfield, VA (US); Eddie L. Chang, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/267,920

(22) Filed: Feb. 25, 1999

(51) Int. Cl.[7] ........................................ C08F 8/32
(52) U.S. Cl. .................. 525/381; 525/332.2; 525/338; 525/375; 525/381; 526/261
(58) Field of Search ................. 525/332.2, 338, 525/375, 381, 332.4, 340, 345, 349; 526/261

(56) References Cited

U.S. PATENT DOCUMENTS

| | | | |
|---|---|---|---|
| 4,032,482 | * 6/1977 | Moriya et al. | 260/2.2 |
| 4,174,428 | * 11/1979 | Tabushi et al. | 525/334 |
| 4,605,706 | * 8/1986 | Kataoka et al. | 525/340 |
| 6,077,421 | * 1/2000 | Puranik et al. | 208/251 |

OTHER PUBLICATIONS

Singh, et al., "Incorporation of Nano–particle Sites in Polymer Matrix by Metal Ion Imprinting," *Mat. Res. Soc. Symp. Proc.*, vol. 501, Materials Research Society, 1998.

* cited by examiner

*Primary Examiner*—David W. Wu
*Assistant Examiner*—Tanya Zalukaeva
(74) *Attorney, Agent, or Firm*—John J. Karasek; Philip E. Ketner

(57) ABSTRACT

Selective, crosslinked chelating polymers are produced by substituting an acyclic chelating agent with a polymerizable functional group. The resulting substituted acyclic chelating agent is then complexed with the target metal ion. A crosslinkable monomer is then added and the complexed material is crosslinked. The complexed metal is then removed, providing a crosslinked polymeric chelating agent that has been templated for the target metal ion.

20 Claims, 2 Drawing Sheets

SYNTHETIC POLYMER MATRICES INCLUDING PRE-ORGANIZED CHELATION SITES FOR THE SELECTIVE AND REVERSIBLE BINDING OF METALS

BACKGROUND OF THE INVENTION

1. Field of the Invention

The present invention relates generally to metal chelation and more specifically to the selective and reversible removal or concentration of a target metal ion.

2. Description of the Background Art

Most commercial methods for removing undesirable metal ions are presently done using reverse osmosis (RO) and/or ion-exchange columns. However, RO is expensive, requires several precleaning stages (that is, it cannot be used in a cost-effective way to treat heavily contaminated waters), and is very susceptible to fouling. Ion-exchange columns can be used for many applications where selectivity and the exchange of one kind of ion for another are not critical factors, but could present problems in other situations. The materials for these columns also do not have a very high binding constant.

In order to get around the above issues, strong chelating agents, such as crown ethers or cyclic amines, can be used. Chelating agents have the advantage of being selective for transition metal ions over most group IA and IIA metal ions and of possessing very high binding (formation) constants, both of which are useful properties for selectively taking up metal ions in a mixed ion system.

These crown ethers or cyclic amines achieve their top formation constants and selectivity through the preorganization of their electron-donors into conformations that are optimal for particular metal ion sizes and coordination geometries. However, the high expense and general unavailability of these materials on a commercial scale preclude their common usage. On the other hand, acyclic chelating agents are common and very low cost compared to the macrocycles. Their disadvantages are their lower binding constants and selectivities in comparison to those of the macrocycles.

Ideally, acyclic chelating agents could be locked into an optimal geometry such that a target metal ion, and no other ion, could fit into that nanoscale receptacle. Current knowledge of the required conformations and thermodynamics needed for optimization is inadequate for designing sites having those optimal geometries. Additionally, the cost of such a "chelation by design" approach would be prohibitive and would eliminate the cost advantage possessed by acyclic chelating agents.

SUMMARY OF THE INVENTION

Accordingly, it is an object of this invention to selectively and reversibly bind metals to an acyclic chelating agent.

It is another object of the present invention to inexpensively optimize the selectivity and metal binding efficiency of an acyclic chelating agent.

It is a further object of the present invention to inexpensively provide a chelating agent in a conformation that selectively binds to only a single metal a narrow range of target metal ions.

These and additional objects of the invention are accomplished by substituting an acyclic chelating agent with at least one polymerizable functional group. The resulting functional group-substituted chelating agent monomer is then reacted with the target metal. During complexation, the acyclic chelating moiety forms chelation rings that are dependent on target metal-ion size and geometry and are thus optimized for the target metal. In this way, the functional group-substituted chelating agent is "templated" for the target metal. The complexed functional group-substituted chelating agent is then reacted with a crosslinking monomer to form a crosslinked polymer including the chelating moiety. The crosslinking step locks in the templating that occurs during complexation. The metal is then removed from the crosslinked polymer, for example, by acid washing.

BRIEF DESCRIPTION OF THE DRAWINGS

A more complete appreciation of the invention will be readily obtained by reference to the following Description of the Preferred Embodiments and the accompanying drawings, wherein.

DESCRIPTION OF THE PREFERRED EMBODIMENTS

Figure 1:
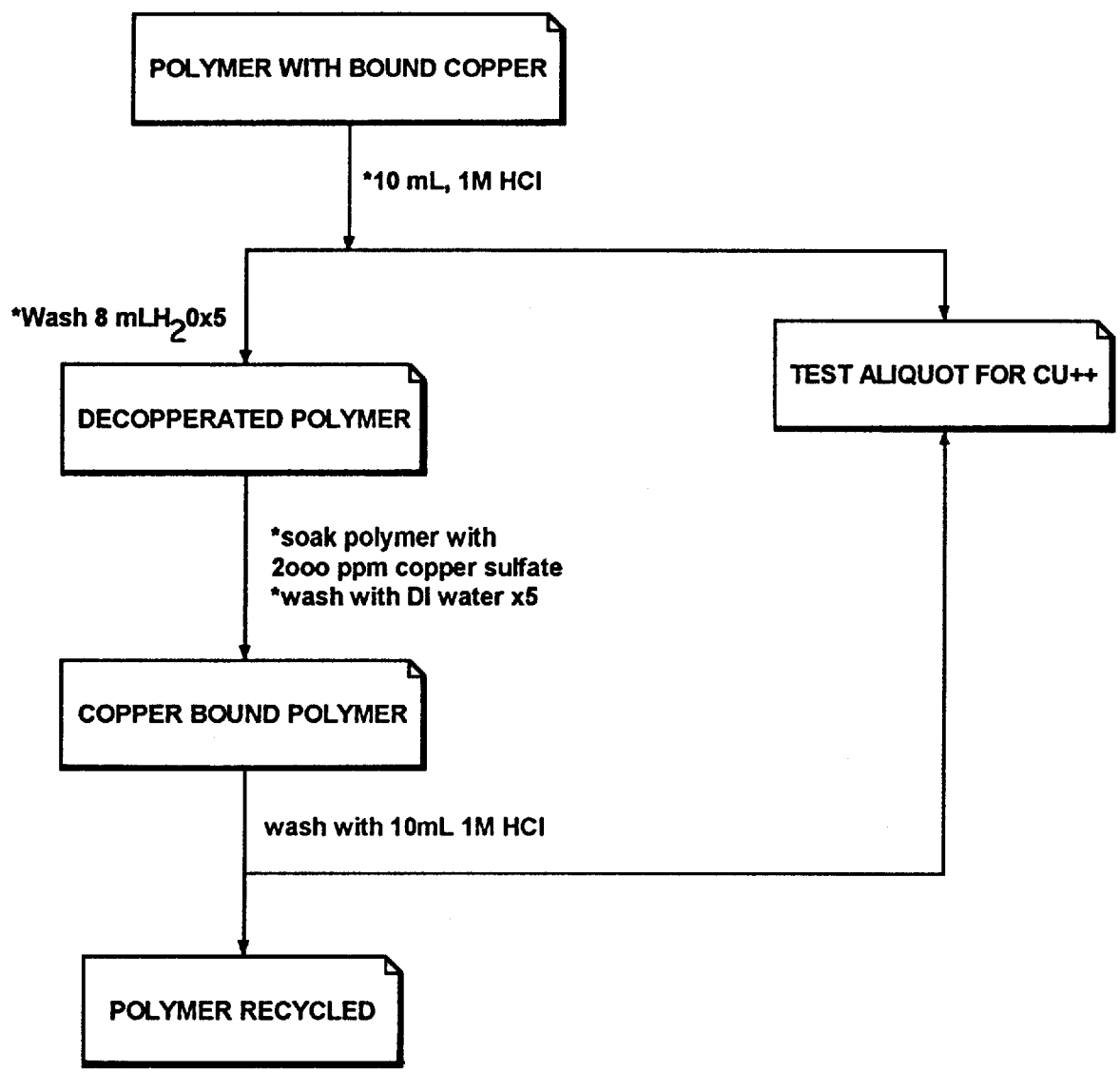
FIG. 1 is a flow chart exemplifying a protocol for a copper binding experiment in an example discussed below.

The method of the present invention may be used with any acyclic chelating agent or functionality that chelates the target metal. Acyclic chelating agents, unlike macrocyclic chelating agents, form chelation rings dependant upon metal ion size and geometry. If possible, the chelating agent or functionality should be one that already exhibits some preference for complexation with, or at least complexes strongly with, the target metal. The selection of an appropriate chelating agent influences somewhat the degree of selectivity obtainable according to the method of the present invention, since the selectivities of optimized configurations of chelating agent for a specific metal may vary depending upon the chelating agent/target metal combination.

Some typical chelating agents useful in the present invention include:

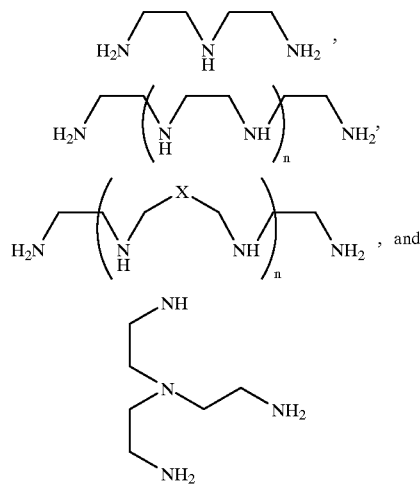

where n is 2 to 6, inclusive, and
X is CH$_2$ or

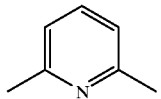

While the chelating agent is typically tridentate or higher, the present invention provides specificity for target metal ions even with only bidentate or monodentate complexing agents. In this case, substituting one or more mono- or bidentate with one or more polymerizable functionalities, contacting the functionalized chelating agents with the target metal ion, polymerizing, and then removing the target metal ion, fixes the arrangement of the chelating agents so that each target metal ion is specifically bound to the polymer by coordinate bonds to each of the chelating agent. That is, the chelating agents, after being fixed in position by polymerization, act jointly as if they were a single chelating agent. If desired, mixtures of monodentate, bidentate, and higher chelating agents may also be used.

Additionally, a polymeric chelating agent specific for two or more metals may be produced by contacting the functionalized chelating agents or agents with more that one target metal ion, polymerizing, and then removing the target metal ions from the polymerized chelating agent.

The functional group with which the chelating agent is substituted should copolymerizable with a crosslinking monomer (also referred to herein as a matrix monomer) to form a crosslinked polymer that is sufficiently rigid to lock in the conformation of the chelating moiety but is also sufficiently porous to enable free flow through the polymer of the solution containing the target metal ion. That is, contact of the dissolved metal ion with the chelation sites of the crosslinked polymer should not be diffusion limited. Typical polymerizable substituents include vinylbenzyl groups (e.g., by substitution using vinylbenyl chloride), acryloyl groups (e.g., by substitution using acryloyl chloride in a reaction analogous to that used for substitution with vinylbenzyl groups), methacryloyl groups (e.g., by substitution using methacryloyl chloride in a reaction analogous to that used for substitution with vinylbenzyl groups), and mixtures of these groups. Leaving groups other than the chloride can be used in the substitution reaction. The final crosslinked polymer should be also insoluble in the media in which the target metal is to be chelated. Also, to assure that templating is maintained, the resulting polymer should be non-swellable in the solvent in which the target metal ion is to be chelated. If the target metal ion or the environment in which the chelating polymer of the present invention is to be used is radioactive, the final crosslinked copolymer should also be sufficiently radiation hard to function under such conditions.

Any crosslinking matrix monomer which copolymerizes with the functional group attached to the chelating agent may be used, provided that the crosslinking reaction can provide the desired porous, nonswellable crosslinked polymer. If desired, the crosslinking matrix monomer may actually be a mixture of such crosslinkable monomers. Typical crosslinkable matrix monomers include TRIM (2-ethyl-2-(hydroxymethyl)propane-1,3-diol trimethacrylate); vinylbenzene; divinlylbenzene (ortho or para); vinylpyridine (ortho or para); acrylamide; methacrylamide, N,N'-methylene-bisacrylamide; N,N'-phenylene-bisacrylamide; 2,6-bisacylamidopyridine; ethylene glycol dimethacrylate (EDMA); and pentaerythritol tetraacrylate (PETEA), and mixtures thereof. Less than an optimum crosslinking density may decrease the specificity of the crosslinked polymer by allowing the template to collapse. A crosslinking density in excess of the optimum may reduce the activity of the crosslinked polymer toward the target metal as the interaction of the metal ion with the chelation sites on the crosslinked polymer becomes diffusion limited. The optimum crosslinked density for any combination of solvent, metal ion, matrix monomer, and polymerizable functional group may be found empirically without undue experimentation. If the monomer matrix is a mixture of monomers including phenyl-substituted monomers and TRIM or acrylamide monomers, the properties (e.g., flexibility, rigidity, swellability in solvents, radiation resistance, etc.) of the templated polymer may be controlled by varying the ratio of phenyl substituted monomer to TRIM and/or acrylamide monomer.

The method of polymerization used is not critical. Typical polymerization methods include, for example, free radical polymerization and photopolymerization. The use of curing agents that being part of the growing polymer chain may, in some cases, interfere with the ability of the polymer to chelate the target metal. The use of catalytic curing agents, which simply initiate curing, should not present such difficulties.

Having described the invention, the following examples are given to illustrate specific applications of the invention including the best mode now known to perform the invention. These specific examples are not intended to limit the scope of the invention described in this application.

EXAMPLES

In these examples, the chelating agent modified to include a polymerizable functionality was triethylenetetraatnine (TETA). Other chelators could have been used. Likewise, another matrix monomer, metal ion, polymerizable functionality, and combinations thereof could have been selected.

The reaction scheme below illustrates the reaction scheme used according to the examples.

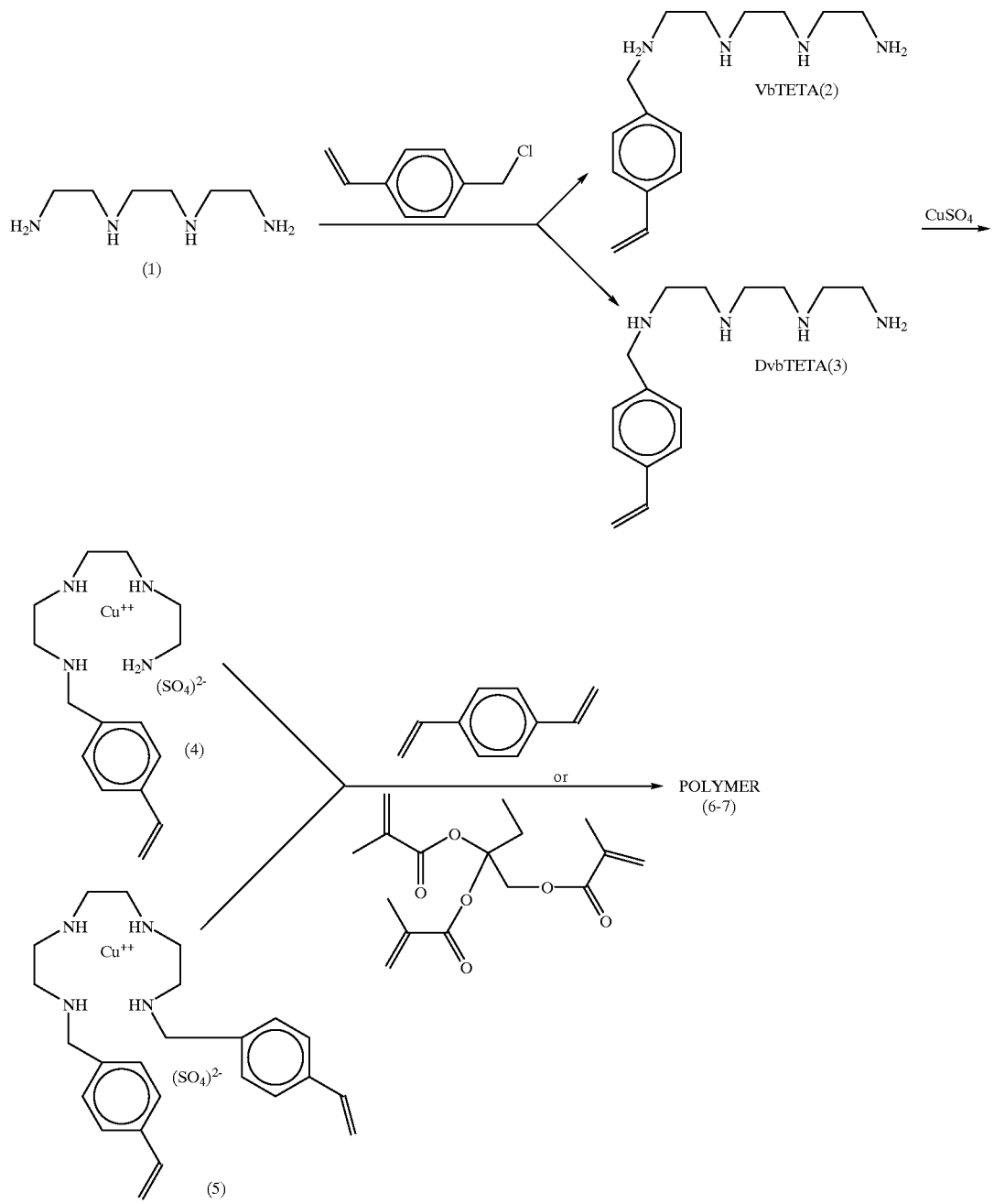

The syntheses of two polymeric variations are shown: monovinylbenzen-TETA-M (Mvb, where M stands for the target metal ion (in this example, $Cu^{2+}$), and divinylcenzene-TETA-M (Dvb) polymers. The multi-dentate, acyclic amine, TETA has, by itself, some selectivity towards different metal ions. The first step in the procedure was to attach either the Vb or Dvb to TETA, followed by formation of a complex between the Vb-TETA and Dvb-TETA products and a metal ion, e.g., Cu(II). The binding of a multi-dentate ligand to their target molecule stabilizes the ligand into a "pseudo" closed-conformation that will be, by definition, a stable chelator conformation that is specific for that particular species of metal ion. This metal-chelator complex then serves as a template, around which a holding matrix is constructed, using TRIM as the matrix binder. That is, a standard locking-in of this conformation is performed by imprint polymerization.

All chemicals including triethylenetetraamine hydrate (TETA), 4-vinylbenzyl chloride (Vb), copper (II) sulfate pentahydrate were obtained from Aldrich Chemical Company. TRIM, 2 ethyl-2-(hydroxymethyl)propane -trimethacrylate, was obtained from TCI. All glassware was thoroughly rinsed with deionized (DI) water before performing metal ion analysis. Elemental analysis was performed by Oneida Research Services, Whitesboro, N.Y. Melting points were determined on Fisher-Jones melting point apparatus. UV/visible spectra were recorded on Backman DU650 spectrophotometer. Infrared spectra were recorded on Nicolet Impact 400D FT-IR instrument, NMR spectra were recorded on a Bruker AC-250 instrument at 250 MHZ. Polymer textures were examined on an ElectroScan Model 2020 Environmental Scanning Electron Microscope (ESEM).

Synthesis of N-(4-vinyl)benzyl Triethylenetetraamine (Vb-TETA), 2

Vinyl benzyl chloride (5.4 g, 35 mmol) was added to a suspension of TETA (3.0 g, 20 mmol) and $NaNH_2$ (0.80 g, 21 mmol) in ether. The suspension was refluxed for 5 h. Ether was removed by rotary evaporation and the residue was dissolved in 40 ml water. The organic material containing vinyl benzyl chloride and disubstituted TETA was removed by chloroform extraction (3×20 ml). Water was removed by freeze drying to yield 1.4 g (14% yield) Vb-TETA as a viscous oil. Proton and carbon-13 NMR showed that product was mixture of isomeric monosubstituted TETA.

Analysis. Calcd. for $C_{15}H_{26}N_4$: C, 68.65; H, 9.98. Found: C, 63.28; H, 8.33.

Synthesis of N,N-di (4-vinyl)benzyl Triethylenetetraamine (DVb-TETA), 3

To 2.04 g (14 mmol) triethylenetetraamine suspended in 20 mL diethyl ether, 4.27 g (28 mmol) vinylbenzyl chloride (VBz) in 10 mL ethyl ether was carefully added at room temperature. The solution was stirred for 3 days at room temperature. Solvent was then removed from the reaction mixture by rotary evaporation under reduced pressure. Care was taken to keep reaction mixture at room temperature and protected from light. Unreacted TETA was removed from solid residue by washing its chloroform solution with water. Absence of TETA in aqueous layer was confirmed by addition of few drops of 10% copper sulfate solution, which produces intense blue color in the presence of amine ligand. Material was obtained by removing chloroform, purified by column chromatography on silica gel (70–230 mesh silica/$CHCl_3$: MeOH,9:1)leaving pure DVb-TETA (0.48 g, 9% yield). Analysis. Calcd. for $C_{24}H_{34}N_4$: C, 76.12; H, 9.05. Found: C, 66.54; H, 7.26.

Preparation of Vb-TETA Copper Complex, 4

1.25 g (5 mmol) copper sulfate was dissolved in minimum amount of water (2–3 mL) and diluted with 25 mL ethanol. This solution was added to 1.37 g (5.23 mmol) TETA-vinylbenzyl dissolved in 40 mL methanol. The blue precipitate was filtered and dried. The filtrate was concentrated and re-suspended in methanol. The resulting precipitate was filtered and collected. Re-concentration/re-filtration process was repeated to collect most of the VB-TETA-Cu complex. The combined fractions of blue complex were dried under vacuum to give 1.43 g (4) in 65% yield. The water soluble complex has Rf of 0.15 (silica/MeOH or MeOH:chloroform 1:1) and charred on TLC plate. Analysis. Calcd. for $C_{15}H_{26}N_4O_4SCu$: C, 42.70; H, 6.21; N, 13.28. Found: C, 42.33; H, 7.43; N, 12.55.

Preparation of Dvb-TETA Copper Complex, 5

To a solution of DVb-TETA (0.36 g, 0.95 mmol) in 20 mL chloroform/methanol (7:3),0.55 g (2.1 mmol) $CuSO_4.5H_2O$ in 15 mL water was added. The solution was stirred thoroughly. The organic layer turned navy blue due to the formation of copper complex. Water layer containing excess copper was discarded and the organic layer was washed with water till no free copper ions were detected in water washing. Removal of solvent afforded 0.48 g of navy blue (5) in quantitative yield. Analysis. Calcd. for $C_{24}H_{34}N_4O_4SCu$: C, 53.58; H, 6.37; N, 10.41. Found: C, 65.06; H, 7.01; N, 7.47.

Synthesis of Polymers from Vb-TETA-Cu Incorporated in TRIM Matrix, 6a,b

Synthesis of metal-ion containing polymer was achieved by copolymerizing (4) with matrix monomer 2-ethyl-2-(hydroxymethyl)propane-1,3-diol trimethacrylate (TRIM). Two preparation of polymers containing 5 mol % (6a) and 10 mol % (6b) Vb-TETA-Cu complex cross-linked to matrix monomer were made. Polymers were synthesized using a reported procedure with some modification (P. K. Dhal, S. Vidyasankar, and F. H. Arnold, *Chem. Mater.*, 7, 154 (1995); R. Moris, R. A. Muck, C. A. Marshall, J. H. Howe, *J. Amer. Chem. Soc.*, 81, 377 (1959)). Complex (4) was dissolved in THF with the aid of common laboratory bath sonicator. This helped in degassing the solvent. Weighed amount of TRIM was added to the solution and nitrogen was bubbled thoroughly for at least 15 minutes. The solution was mounted on an oil bath, and heated to 70° C. while stirring the solution by magnetic stirrer. At this time radical initiator azo bis isobutyro-nitrile (AIBN) was added to start polymerization. After about 16 hours, the temperature of the reaction mixture was raised to 85° C. Polymer formation may be seen at this time. Finally, the reaction mixture was heated to 90° C. to complete the polymerization. Polymer (6) was isolated by filtration, washed well with water and methanol to remove any impurities, and stored after drying under high vacuum.

Synthesis of Polymer containing 5 mol % Vb-TETA-Cu Complex, 6a

A THF solution of 172 mg (0.4 mmol) Vb-TETA -Cu was copolymerized with 3.3 g (9.76 mmol)TRIM in 30 mL methanol. To the homogenous solution 100 mg AIBN was added and the reaction mixture was left for 16 hours stirring at 70° C. The temperature was then raised to 85° C. which caused the solution to turn into solid powdery suspension within 1 hour. The solid polymer was filtered off and washed well with water and methanol and dried under vacuum to give 4 g polymer (6a).

Synthesis of Polymer Containing 10 mol % Vb-TETA-Cu Complex, 6b

Following the general procedure, 210 mg (0.5 mmol), (4) dispersed in 50 mL THF was cross linked with 1.69 g TRIM (5 mmol) in 25 mL THF with the aid of 20 mg AIBN. After 18 hours a thick viscous slurry was obtained which was diluted with additional 25 mL THF followed by the addition of 10 mg AIBN. The mixture was heated at 70° C. for 4 hours, and 80° C. for 1 hour. After usual work up 1.73 g (6b) was obtained as solid blue product.

Synthesis of Polymers from DVb-TETA-Cu Incorporated in Trim Matrix, 7a,b

Complex (5) was cross linked with TRIM essentially following the procedure for (6). For low loading of metal ion complex monomer THF was used as solvent while for 10% loading MeOH was used. The reaction mixtures were sequentially heated to 70° C., 80° C., and 90° C. after the addition of radical initiator AIBN. Work up procedure was essentially the same as for (6).

Synthesis of Polymer containing 5 mol % DVb-TETA-Cu Complex, 7a

A 100 mg (0.18 mmol) light blue, DVb-TETA-Cu complex was dissolved in 25 mL THF and to this solution 1.9 g (5.6 mmol) TRIM in 25 mL methanol was added to the clear blue solution 100 mg AIBN was added after thoroughly displacing oxygen by flushing nitrogen. The solution was stirred and heated for 16 hours at 70° C., at 80° C. for 3 hours and at 90° C. for 1 hour polymers was observed to form. The polymer was filtered off, washed with methanol and dried thoroughly in vacuum to give 1.8 g material.

Synthesis of Polymer Containing 10 Mol % DVb-TETA-Cu Complex, 7b

Following the general procedure, divinylbenzyl-TETA-Cu-Complex (133 mg, 0.24 mmol) was cross linked with 845 mg, 2.5 mmol TRIM solution in 25 mL methanol. 100 mg AIBN was added as a polymerization initiator. After usual work up 900 mg dry polymer was recovered.

Measurement of Metal-ion Bound to Imprinted Polymers

FIG. 1 shows the protocol used in the quantitative analysis of metal ions bound to various polymers. In a typical experiment, copper ions bound to polymer were released by treating 100 mg polymeric material with 10 mL, 1M HCl. An 0.5 mL aliquot of the supernatant was withdrawn and diluted to 10 mL by adding DI water. For analysis, to 0.5 mL diluted sample were added 5.5 mL water, 1 mL hydroxylamine hydrochloride (10%), 1 mL bathocuproine (0.1%), and 2 mL ammonium acetate (10%) (I. Vogel, *Textbook of Quantitative Chemical Analysis*, 5th Edition, (Longman Scientific Technical Publisher), p. 689). The absorption values of resulting colored solution were measured at 480 nm. By using the standard curve, the adsorbence were directly correlated with the amount of copper ion present in the test sample.

For measuring repeatable (reversible) binding capacity, a weighed amount (50–100 mg) of non-metal bound polymer was soaked in 1M HCl, re-washed with DI water (5×), re-soaked with 15 mL 2000 ppm copper sulfate solution, and washed for 5 times with DI water. Rebinding of the copper was measured following the protocol described in preceding paragraph. For mixed metal studies a solution containing 2168 ppm Cu and 2152 ppm Zn from copper and zinc sulfate salts was used. For example, 0.107 g Vb-TETA-Cu-TRIM polymer was soaked in 10 mL 1M HCl to remove the templating copper from the polymer, then washed with 150 mL water, soaked for a few minutes each time to ensure removal of the acid, and then treated with the CuIZn solution for 36 h. In another protocol, the acid-washed polymer (copper-free) was treated first with the Zn solution, rinsed, then treated with the copper solution. The solutions were analyzed for copper only.

Measurement of Binding Constants for Polymers 6 and 7

The following protocol has been used to measure formation constants in polymers (6b) and (7b). A thoroughly dried, weighed amount of Vb-TETA-TRIM-Cu was treated with 10 mL, 1M HCl to remove copper ions. The resulting polymer was washed with DI water (×5), 10 mL, 1M HCl (×1), and again with DI water (5×). Finally, the polymer was soaked in 2 mL conc. HCl twice for 1 minute each. The excess HCl was removed by washing with water and the polymer was thoroughly dried under vacuum. A 50 mg polymer was titrated with 0.1M NaOH using a Orion model 920A pH meter.

Results and Discussions

Figure 2:
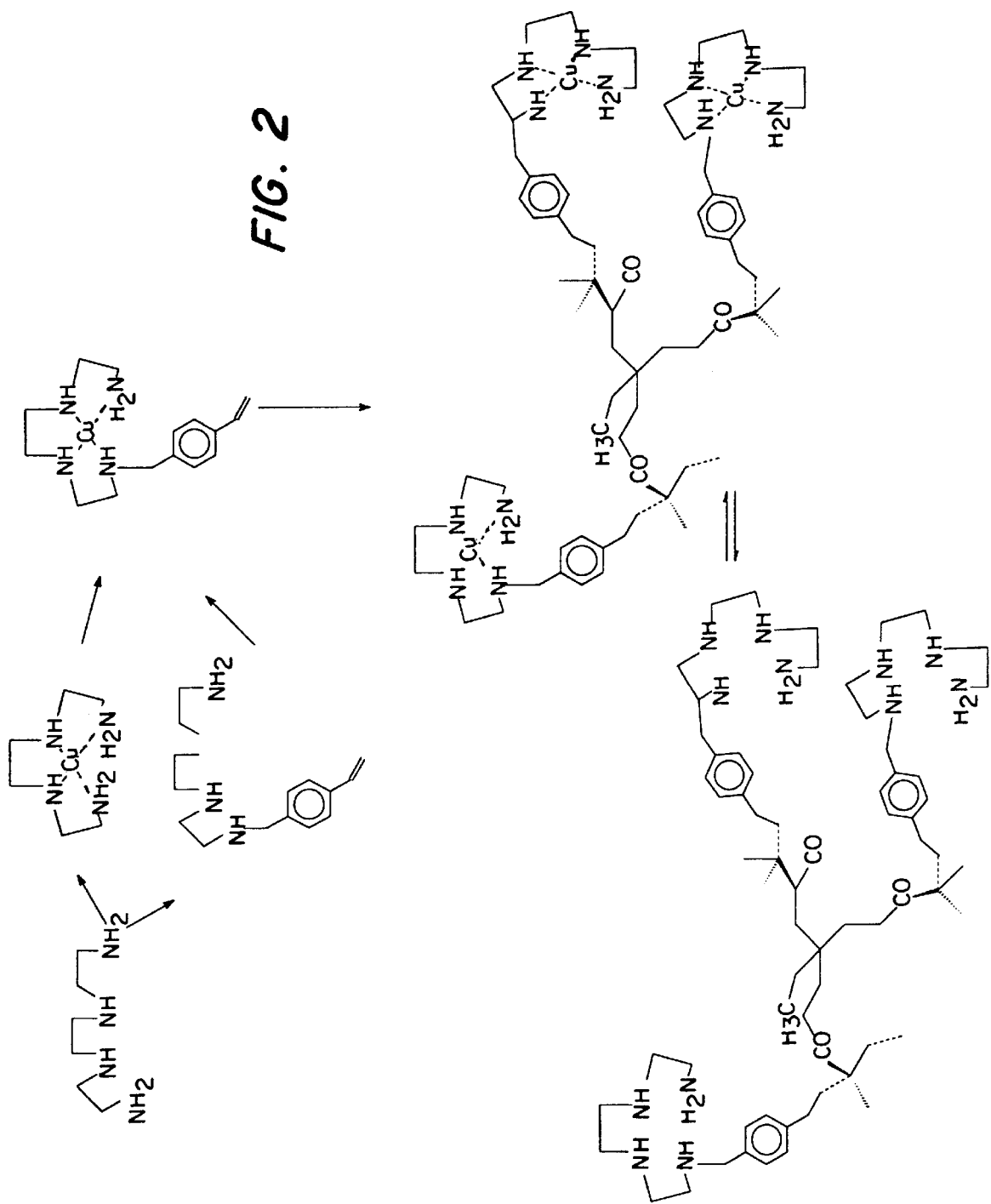
FIG. 2 shows an example of the preorganization and locking in of a chelating site as per a method according to the present invention.

Polymeric materials consisting of metal-ion selective sites capable of reversible binding have potential uses in areas ranging from environmental to electronic applications. This invention describes the synthesis and metal-ion binding behavior of two such polymers made by molecular imprinting approach (G. Wulff, *Angew. Chem. Int. D. Engl.*, 34, 1812 (1995); M. E. Davis, A. Katz, and W. R. Ahmad, *Chem. Mat.* 8, 1820 (1996); R. Hoss and F. Voegtle, *Angew. Chem. Int. Ed. Engl.*, 33, 3745 (1994); K. J. Shea, *Trends Polym. Sci.*, 2, 166 (1994). For this approach, monomer metal-ligand complexes (4) and (5) are cross linked with matrix monomers, which form a porous cast around the complex to retain its geometry. As shown in FIG. 2, the metal-ion site's conformation is initially kept intact through the cross-linking process by the presence of the metal ions and then is preserved by the crosslinked matrix after the metal ions have been removed by acid. Scheme 1, exemplified in the above-illustrated reaction, depicts the synthetic route followed for making such polymers.

Attempts at the classical template-directed synthesis of (4) by reacting TETA-CuSO$_4$ complex with vinylbenzyl chloride did not work, but required the presence of the templating metal ion. On the other hand, formation of pure products of (4) and (5) was easily achieved by taking advantage of the water solubility of (4), which allowed the separation of the hydrophobic (5) compound from the reaction mixture during synthesis. NMR spectrometry revealed that, in the case of either (4) or (5), vinylbenzyl substitution was not limited to any single nitrogen atom in TETA and other positional isomers existed. However, the position of substitution did not affect the overall goal.

In order to compare metal ion binding results with imprinted polymers, (6) and (7), we synthesized poly TRIM cross linked just with styrene and divinylbenzyl TETA. While polymerization proceeded smoothly in the cases of styrene and divinylbenzyl-TETA, monomers metal-complexes polymerized vigorously producing crackling sounds particularly at 90° C. We chose to sequentially raise the bath temperature for safe polymerization reactions and for obtaining reproducible polymer batches.

Solvents played an important role in polymerization reaction. Cross linking of (4) with TRIM proceeded smoothly in THF, while the DVb-TETA-Cu-TRIM polymerization required methanol as the solvent. This is particularly true for cases involving 10 mol percent or higher loading of the monomer metal complex.

Results on copper binding studies are compiled in Table-I. All values are averages of at least two measurements per experiment. Poly TRIM cross linked with just styrene gave values similar to that of poly TRIM cross linked with DVb-TETA monomer (without preformation of any metal complex), which is ~2 mg/g polymer. This is an important observation in that it was unexpected. One would not have expected such a dramatic difference between polymers made in the presence or in the absence of a metal ion. In either case, values for copper binding were within the range of experimental errors. Polymers (6a), and (6b) showed better binding capacity than (7a) or (7b), which was derived from disubstituted TETA copper complex.

TABLE I

METAL-ION UPTAKE BY VARIOUS POLYMERS

| POLYMER | BOUND Cu (Range) mg/g Polymer |
| --- | --- |
| Poly (Styrene-TRIM) | 1–3 |
| Poly (DVb-TBTA-TRIM (10%) | 1.9–1.3 |
| Vb-TETA-Cu-TRIM | |
| 5% incorporation (6a) | 13 |
| 10% incorporation (6b) | 17 |
| DVb-TETA-Cu-TRIM | |
| 5% incorporation (7a) | 7 |
| 10% incorporation (7b) | 16 |

Examination of polymer texture under scanning electron microscope showed a clear difference in texture, and appearance between metallated and unmetallated Vb-TETA-polymers. The metallated Vb-TETA polymer formed sheet-like materials, while the copper-bound polymer, (7b), appeared as uniform spherical beads. The DVb-TETA polymer, on the other hand, did not appear to change in either size or shape.

Both the mono- and di-vinylbenzene TETA polymers retained their metal-binding capability after multiple bind-release-bind cycle. For example, a capacity of 22 mg Cu/g polymer was observed in each of three consecutive copper binding and acid removal. In the case of 10% incorporation of (4) or (5) into the matrix monomer TRIM, a maximum of 25 mg/g copper uptake is possible. The results suggest that the binding efficiency of polymers can be increased with increasing amounts of TETA, although increased amounts of TETA will also affect the physical characteristics of the polymer.

To test the metal selectivity of the polymers, DVb-$CuSO_4$-TETA polymer samples were initially treated with 1M HCl to remove the copper ions. In one test the demetallated polymer samples were soaked in a zinc-copper (1:1) solution, washed with water, and the amount of bound Cu measured. In another test, the demetallated samples were soaked in a concentrated Zn solution, then in concentrated Cu solution before measuring the amount of copper adsorbed. A binding capacity of around 19 mg copper per gram polymer from both methods suggested that the presence of copper template had a very high preference for copper over zinc. The experiments were repeated on the same polymer. Comparable binding values were obtained which were indicative of the ruggedness of the imprinted sites.

The protonation constants of the vinylbenzyl- and divinylbenzyl-TETA polymers, (6) and (7), were determined through titration and compared with those of TETA. The values are compiled in Table II. It was found that the first protonation constant for Vb-TETA and the first two protonation constants for DVb-TETA polymers were much higher than for TETA, whereas the third and fourth constants of the DVb-TETA polymer were lower than the corresponding values of TETA. An increase in basicity, such as observed, is expected for the alkylation of an amine (A. E. Martell, R. D. Hancock, and R. J. Motekaitis, *Coord. Chem. Reviews*, 133, 39 1994)). Interestingly, the values for the third and fourth constants for the DVb-TETA polymer had changed to become similar to that of cyclic tetra amine 'cyclam' (D. B. Puranik, A. Singh, and E. L. Chang, *J. Coordination Chem*, 39, 321 (1996)), perhaps implying that the locked conformation for the TETA in the DVb-TETA polymer may have also become similar to that of cyclam.

Conclusions

Metal-binding sites have been successfully incorporated into macro porous polymers following the techniques of metal-ion imprinting and template-directed synthesis. Metal-ligand templates embedded in polymer matrices provide selectivity towards templated metal ions. Easy removal of metal ions from the polymer sites demonstrate that the poly TRIM matrix is porous enough to allow access to small ions and the approach may be extended for making polymeric materials templated with other metal ions. These polymeric materials can function as metal-specific Asponges™ for removing targeted heavy-metal ions for environmental cleanup.

The present invention may be used to chelate any metal, but is particularly useful for the selective chelation of divalent or higher metals. The removal of heavy metals and radioactive metal is of particular interest because of the toxicity of those metals. High concentrations of other metals, such as zinc, nickel, and copper also present toxicity problems and may be reduced by use of the present invention. Further, the chelating polymers of the present invention may be useful in recovery of metals from processing wastes, as well as in the isolation and separation of useful metals from a variety of sources.

Obviously, many modifications and variations of the present invention are possible in light of the above teachings. It is therefore to be understood that, within the scope of the appended claims, the invention may be practiced otherwise than as specifically described.

What is claimed is:

1. A crosslinked polymer that includes sites that specifically bind to a first target metal ion, said polymer being the product of:

substituting a first chelating agent with a first polymerizable functional group to form a first polymerizable chelating agent;

complexing said first polymerizable chelating agent with said first target metal ion;

polymerizing said complexed first polymerizable chelating agent with a crosslinkable monomer to form said crosslinked polymer;

removing said first target metal ion from said crosslinked polymer.

2. The crosslinked polymer of claim 1, said polymer being the product of the further steps of:

substituting a second chelating agent with a second polymerizable functional group to form a second polymerizable chelating agent;

complexing a mixture of said first polymerizable chelating agent and said second polymerizable chelating agent with said first target metal ion;

polymerizing said complexed first and second polymerizable chelating agents with a crosslinkable monomer to form said crosslinked polymer;

removing said first target metal ion from said crosslinked polymer.

3. The crosslinked polymer of claim 1, said polymer being the product of the further steps of:

complexing said first polymerizable chelating agent with a mixture of said first target metal ion and a second target metal ion;

polymerizing said complexed first polymerizable chelating agent with a crosslinkable monomer to form said crosslinked polymer;

removing said first target metal ion and said second target metal ion from said crosslinked polymer, thereby providing a crosslinked polymer that specifically chelates said first metal ion and said second metal ion.

4. The crosslinked polymer of claim 1, wherein said first chelating agent is selected from the group consisting of:

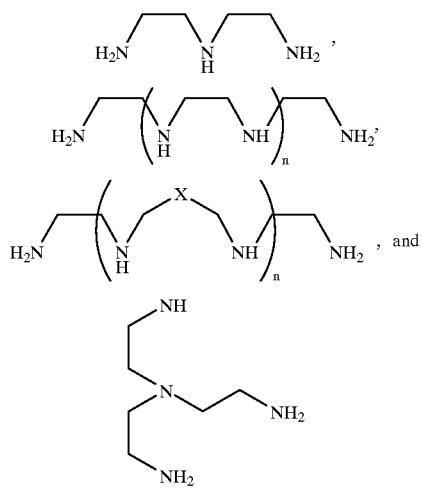

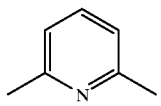

where n is 2 to 6, inclusive, and

X is CH₂ or

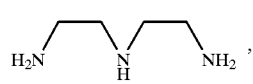

5. The crosslinked polymer of claim 1, wherein said first polymerizable functional group is selected from the group consisting of a vinylbenzyl group, an acryloyl group, and a methacryloyl group.

6. The crosslinked polymer of claim 1, wherein said crosslinkable monomer is selected from the group consisting of 2-ethyl-2-(hydroxymethyl)propane-1,3-diol trimethacrylate; vinylbenzene; orthodivinlylbenzene or paradivinylbenzene; orthovinylpyridine, paravinylpyridine; acrylamide; methacrylamide, N,N'-methylene-bisacrylamide; N,N'-phenylene-bisacrylamide; 2,6-bisacylamidopyridine; ethylene glycol dimethacrylate; and pentaerythritol tetraacrylate.

7. The polymer of claim 1, wherein said first target metal ion is a di- or higher valent metal ion.

8. The crosslinked polymer of claim 7, wherein said first target metal ion is $Cu^{2+}$.

9. A method of forming a crosslinked, chelating polymer, comprising the steps of:

substituting a first chelating agent with a first polymerizable functional group to form a first polymerizable chelating agent;

complexing said first polymerizable chelating agent with said first target metal ion;

polymerizing said complexed first polymerizable chelating agent with a crosslinkable monomer to form said crosslinked polymer;

removing said first target metal ion from said crosslinked polymer.

10. The method of claim 9, wherein said first chelating agent is selected from the group consisting of:

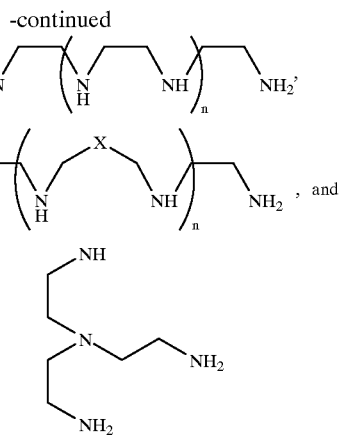

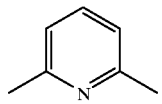

where n is 2 to 6, inclusive, and

X is CH₂ or

11. The method of claim 9, wherein said first polymerizable functional group is selected from the group consisting of a vinylbenzyl group, an acryloyl group, and a methacryloyl group.

12. The method of claim 9, wherein said crosslinkable monomer is selected from the group consisting of 2-ethyl-2-(hydroxymethyl)propane-1,3-diol trimethacrylate; vinylbenzene; orthodivinlylbenzene or paradivinylbenzene; orthovinylpyridine, paravinylpyridine; acrylamide; methacrylamide, N,N'-methylene-bisacrylamide; N,N'-phenylene-bisacrylamide; 2,6-bisacylamidopyridine; ethylene glycol dimethacrylate; and pentaerythritol tetraacrylate.

13. The method of claim 9, wherein said first target metal ion is a di- or higher valent metal ion.

14. The method of claim 13, wherein said first target metal ion is $Cu^{2+}$.

15. A method of selectively chelating first target metal ion, said method comprising the step of contacting a solution including said first target metal ion with the crosslinked polymer of claim 1.

16. A method of selectively chelating a target metal ion, said method comprising the step of contacting a solution including said target metal ion with the crosslinked polymer of claim 4.

17. A method of selectively chelating a target metal ion, said method comprising the step of contacting a solution including said target metal ion with the crosslinked polymer of claim 5.

18. A method of selectively chelating a target metal ion, said method comprising the step of contacting a solution including said target metal ion with the crosslinked polymer of claim 6.

19. A method of selectively chelating a target metal ion, said method comprising the step of contacting a solution including said target metal ion with the crosslinked polymer of claim 7.

20. A method of selectively chelating a target metal ion, said method comprising the step of contacting a solution including said target metal ion with the crosslinked polymer of claim 8.

* * * * *